United States Patent
Fujishiro et al.

(10) Patent No.: US 9,832,683 B2
(45) Date of Patent: Nov. 28, 2017

(54) COMMUNICATION SYSTEM, USER TERMINAL, AND COMMUNICATION CONTROL METHOD UTILIZING PLURAL BEARERS FOR CELLULAR AND WLAN COMMUNICATION

(71) Applicant: KYOCERA CORPORATION, Kyoto (JP)

(72) Inventors: Masato Fujishiro, Yokohama (JP); Yushi Nagasaka, Yokohama (JP); Hiroyuki Adachi, Kawasaki (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/222,537

(22) Filed: Jul. 28, 2016

(65) Prior Publication Data

US 2016/0337958 A1    Nov. 17, 2016

Related U.S. Application Data

(63) Continuation of application No. PCT/JP2015/063374, filed on May 8, 2015.

(30) Foreign Application Priority Data

May 8, 2014    (JP) .................................. 2014-097180

(51) Int. Cl.
   *H04W 28/08*   (2009.01)
   *H04W 28/02*   (2009.01)
   (Continued)

(52) U.S. Cl.
   CPC ........ *H04W 28/085* (2013.01); *H04L 12/4633* (2013.01); *H04L 47/125* (2013.01);
   (Continued)

(58) Field of Classification Search
   CPC ...... H04W 88/10; H04W 88/06; H04W 84/12; H04W 84/042; H04W 48/18;
   (Continued)

(56) References Cited

U.S. PATENT DOCUMENTS

| 2013/0088983 A1* | 4/2013 | Pragada ................ H04W 16/14 370/252 |
| 2013/0176988 A1* | 7/2013 | Wang .................... H04W 28/08 370/331 |

(Continued)

FOREIGN PATENT DOCUMENTS

| JP | 2003-037621 A | 2/2003 |
| WO | 2012/148482 A1 | 11/2012 |

OTHER PUBLICATIONS

International Search Report issued in PCT/JP2015/063374; dated Aug. 11, 2015.
(Continued)

*Primary Examiner* — Joshua Kading
(74) *Attorney, Agent, or Firm* — Studebaker & Brackett PC

(57) ABSTRACT

A cellular base station is configured to execute functions of: a plurality of packet data convergence protocol (PDCP) entities corresponding to a plurality of bearers used in performing a communication with a user terminal in which the user terminal is configured to utilize radio resources of the cellular base station and a wireless local area network (WLAN) access point; and a specific entity that provides a PDCP packet with a header including a bearer identifier to generate a specific packet, the PDCP packet generated by each of the plurality of PDCP entities. The bearer identifier is for identifying a bearer to which the specific packet
(Continued)

belongs, from the plurality of bearers. The specific entity transmits the specific packet to the user terminal via the WLAN access point.

8 Claims, 11 Drawing Sheets

(51) Int. Cl.
    *H04L 12/803*    (2013.01)
    *H04L 12/46*    (2006.01)
    *H04W 4/00*    (2009.01)
    *H04W 48/18*    (2009.01)
    *H04W 84/12*    (2009.01)
    *H04W 88/06*    (2009.01)
    *H04W 88/10*    (2009.01)
    *H04L 29/06*    (2006.01)
    *H04W 76/00*    (2009.01)
    *H04W 84/04*    (2009.01)
    *H04W 28/12*    (2009.01)

(52) U.S. Cl.
    CPC .............. *H04L 69/22* (2013.01); *H04W 4/00* (2013.01); *H04W 28/0252* (2013.01); *H04W 48/18* (2013.01); *H04W 76/00* (2013.01); *H04W 84/12* (2013.01); *H04W 88/06* (2013.01); *H04W 88/10* (2013.01); *H04W 28/12* (2013.01); *H04W 84/042* (2013.01)

(58) Field of Classification Search
    CPC ... H04W 48/20; H04W 76/00; H04W 76/022; H04W 76/041; H04W 16/26; H04W 40/22; H04W 36/0022; H04W 36/0027; H04W 36/12; H04W 36/16–36/22; H04W 36/38; H04L 47/2483; H04L 47/825; H04L 69/04; H04L 69/22; H04L 61/2592; H04L 29/12575; H04L 12/4633; H04B 7/2606

See application file for complete search history.

(56) References Cited

U.S. PATENT DOCUMENTS

| | | | | |
|---|---|---|---|---|
| 2015/0063295 | A1* | 3/2015 | Himayat | H04W 36/0022 370/331 |
| 2015/0092688 | A1* | 4/2015 | Jeong | H04W 60/005 370/329 |
| 2015/0117357 | A1* | 4/2015 | Ozturk | H04W 28/0205 370/329 |
| 2015/0264726 | A1* | 9/2015 | Zhu | H04W 84/12 370/329 |
| 2015/0327236 | A1* | 11/2015 | Lin | H04W 76/022 370/329 |
| 2016/0066233 | A1* | 3/2016 | Balachandran | H04W 76/026 370/331 |
| 2016/0337485 | A1* | 11/2016 | Nuggehalli | H04L 47/825 |

OTHER PUBLICATIONS

Written Opinion issued in PCT/JP2015/063374; dated Aug. 11, 2015.
3rd Generation Partnership Project; Technical Specification Group Radio Access Network; Study on Wireless Local Area Network (WLAN)—3GPP radio interworking; 3GPP TR 37.834 V12.0.0; Dec. 2013; pp. 1-17; Release 12; 3GPP Organizational Partners.
3rd Generation Partnership Project; Technical Specification Group Radio Access Network; Study on Small Cell enhancements for E-UTRA and E-UTRAN; Higher layer aspects; 3GPP TR 36.842 V12.0.0; Dec. 2013; pp. 1-71; Release 12; 3GPP Organizational Partners.

* cited by examiner

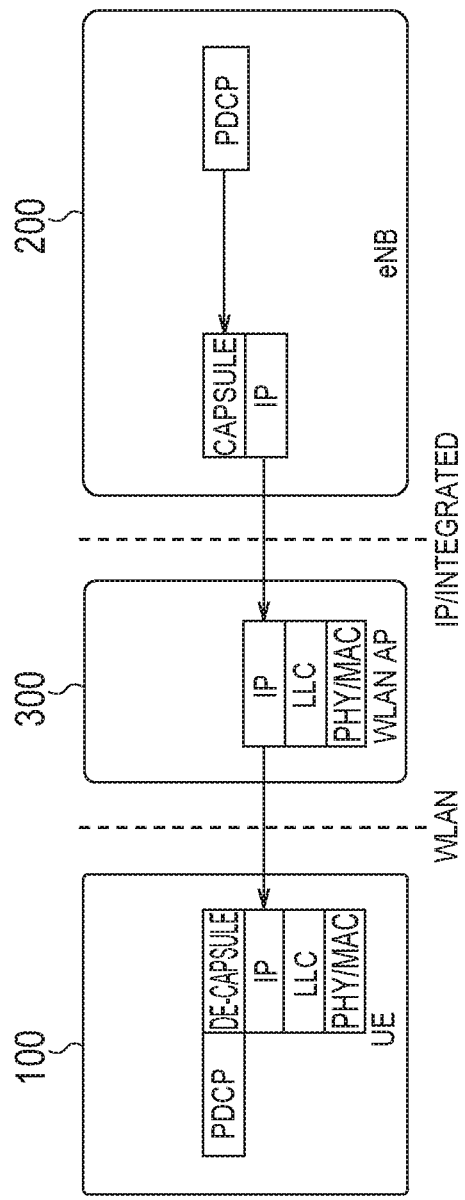
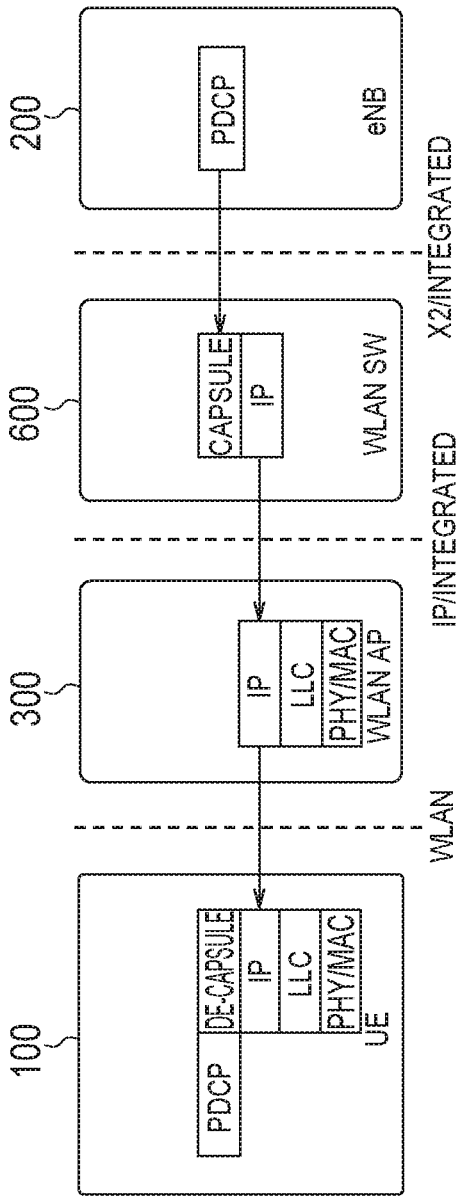
FIG. 8(a)
FIG. 8(b)

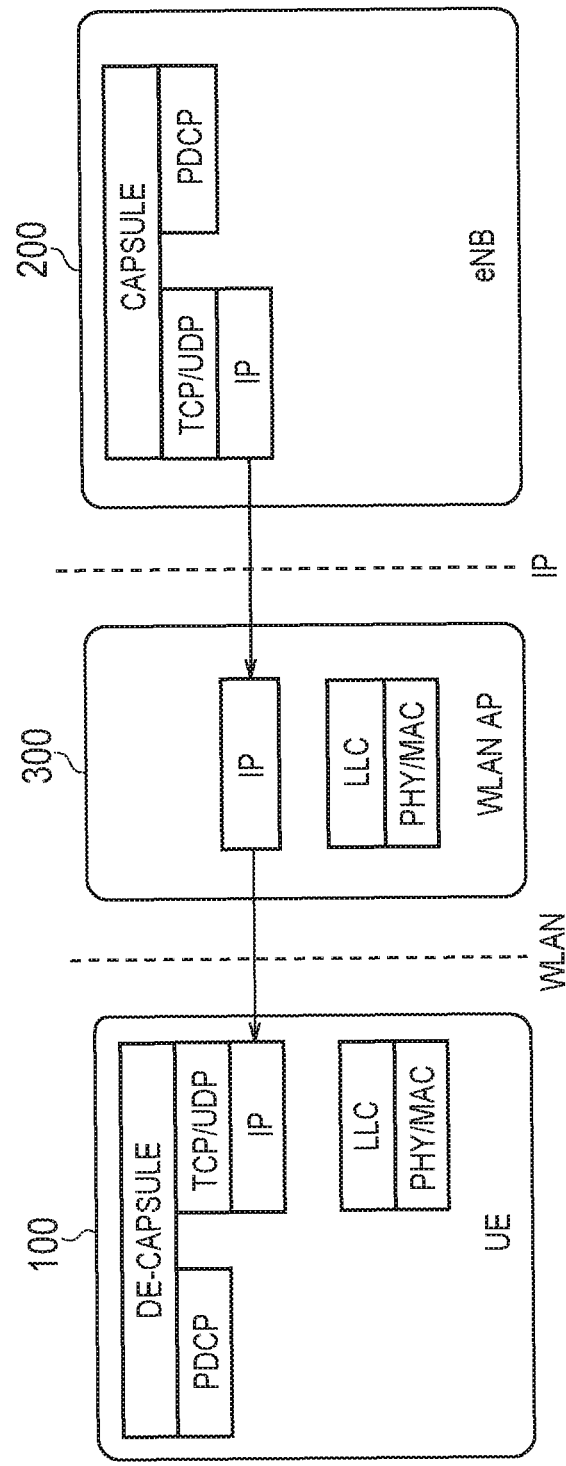

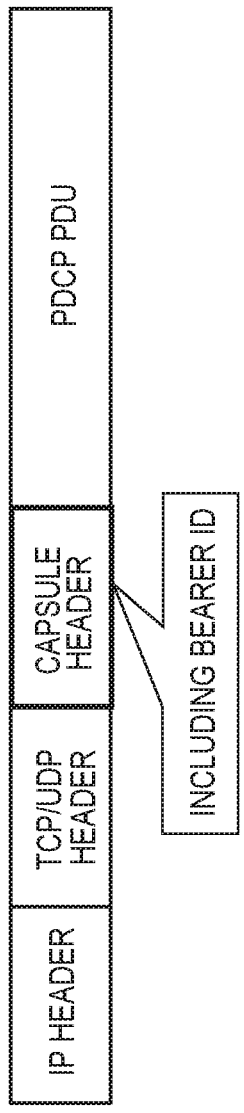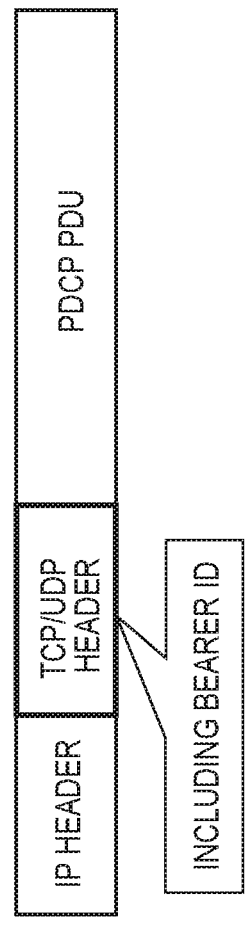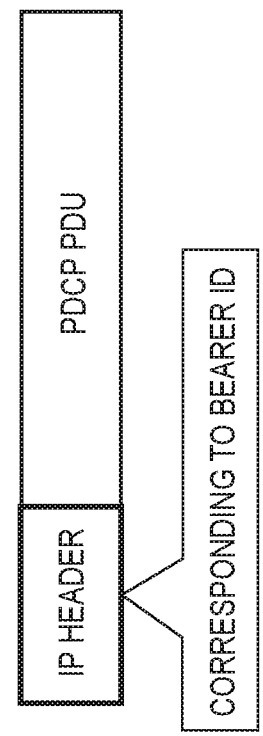

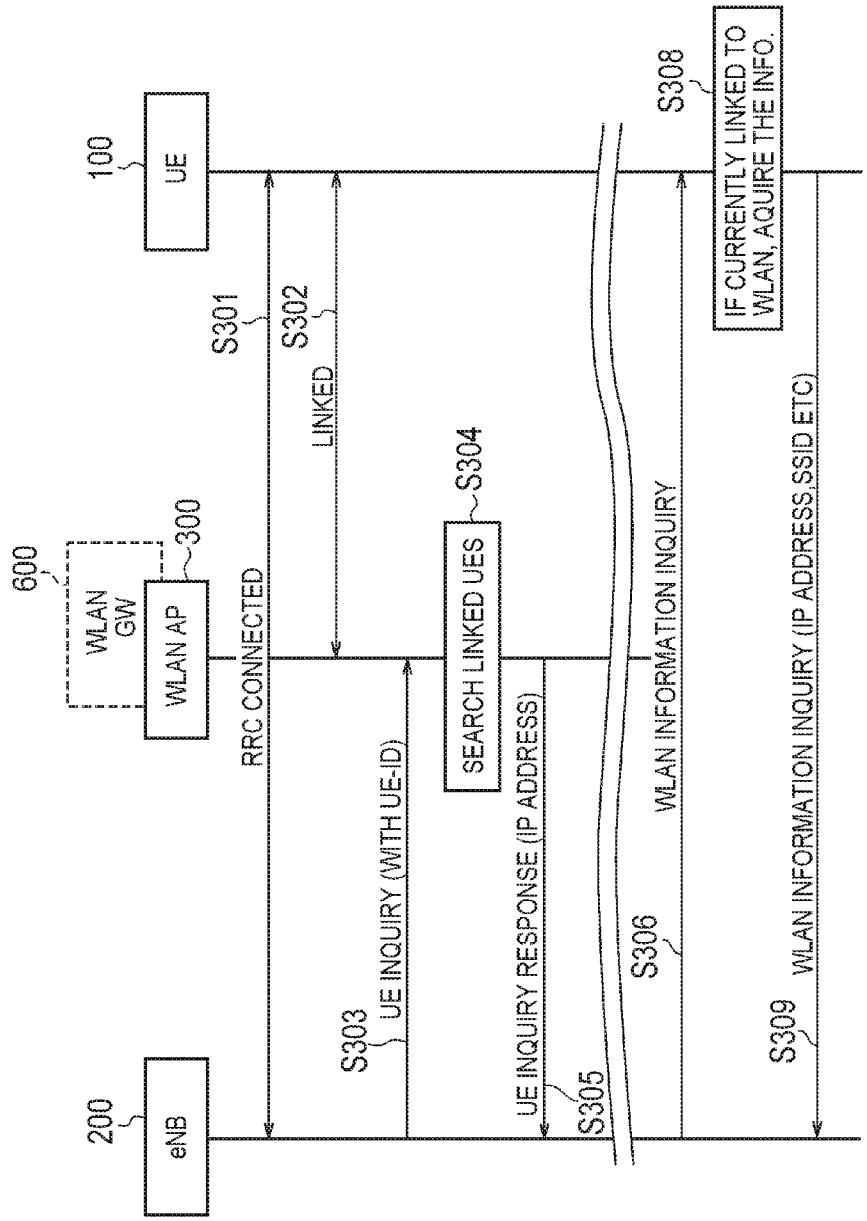

COMMUNICATION SYSTEM, USER TERMINAL, AND COMMUNICATION CONTROL METHOD UTILIZING PLURAL BEARERS FOR CELLULAR AND WLAN COMMUNICATION

FIELD

The present disclosure relates to a communication system, a user terminal, and a communication control method.

BACKGROUND

User terminals capable of cellular communication and wireless local area network (WLAN) communication have become widely used recently. Access points for the WLAN that are managed by operators of the cellular communication network are also increasing. The 3rd Generation Partnership Project (3GPP) has therefore started to study technologies to strengthen interworking between WLAN and cellular radio access network (RAN) (see Non Patent Literature 1).

Meanwhile, a dual connectivity architecture in which a master eNodeB (MeNB) that is a cellular base station for processing data of plural bearers transfers data of some bearers via another cellular base station called a secondary eNodeB (SeNB) to communicate with user terminals has been studied (see Non Patent Literature 2).

CITATION LIST

Non Patent Literatures

Non Patent Literature 1: 3GPP Technical Report "TR37.834 V12.0.0", December 2013
Non Patent Literature 2: 3GPP Technical Report, "TR36.842 V12.0.0", January 2014

SUMMARY

A communication system according to an embodiment includes: a user terminal including a communication unit; and a cellular base station configured to communicate with the user terminal via a WLAN access point using a plurality of bearers. The communication unit communicates with the cellular base station via the WLAN access point using one of the bearers identified in accordance with identification information for uniquely identifying each of the bearers.

A cellular base station according to an embodiment includes a controller containing at least one processor and at least one memory. The controller is configured to execute functions of: a plurality of packet data convergence protocol (PDCP) entities corresponding to a plurality of bearers used in performing a communication with a user terminal in which the user terminal is configured to utilize radio resources of the cellular base station and a wireless local area network (WLAN) access point; and a specific entity that provides a PDCP packet with a header including a bearer identifier to generate a specific packet, the PDCP packet generated by each of the plurality of PDCP entities. The bearer identifier is for identifying a bearer to which the specific packet belongs, from the plurality of bearers. The specific entity transmits the specific packet to the user terminal via the WLAN access point.

A user terminal according to an embodiment includes a controller containing at least one processor and at least one memory. The controller is configured to execute a communication in which the user terminal is configured to utilize radio resources of a cellular base station and a wireless local area network (WLAN) access point. The controller is further configured to execute functions of: a specific entity that receives a specific packet transmitted from the cellular base station via the WLAN access point, the specific packet provided with a header including a bearer identifier that indicates a bearer to which the specific packet belongs; and a plurality of packet data convergence protocol (PDCP) entities corresponding to a plurality of bearers used in executing the communication. The specific packet is provided with a header including a bearer identifier for identifying a bearer to which the specific packet belongs, from the plurality of bearers. The specific entity identifies a destination PDCP entity to which the specific packet is destined based on the bearer identifier, from the plurality of bearers, and delivers the specific packet from which the header is removed, to the destination PDCP entity.

BRIEF DESCRIPTION OF DRAWINGS

FIGS. 8(a) and 8(b) illustrate a protocol stack 1 between the eNB and the UE according to the embodiment.
FIG. 9 illustrates a protocol stack 2 between the eNB and the UE according to the embodiment.
FIGS. 10(a) to 10(c) illustrate a capsuled data structure according to the embodiment.
FIG. 13 is a sequence diagram illustrating an operation procedure of the eNB inquiring information of a user terminal that communicates with the AP according to the embodiment.

DESCRIPTION OF EMBODIMENTS

Embodiments

Hereinafter, an embodiment (present embodiment) in which an LTE system is coordinated with a wireless local area network (WLAN) system will described. The LTE system is a cellular communication system based on 3GPP standards.

Figure 1:
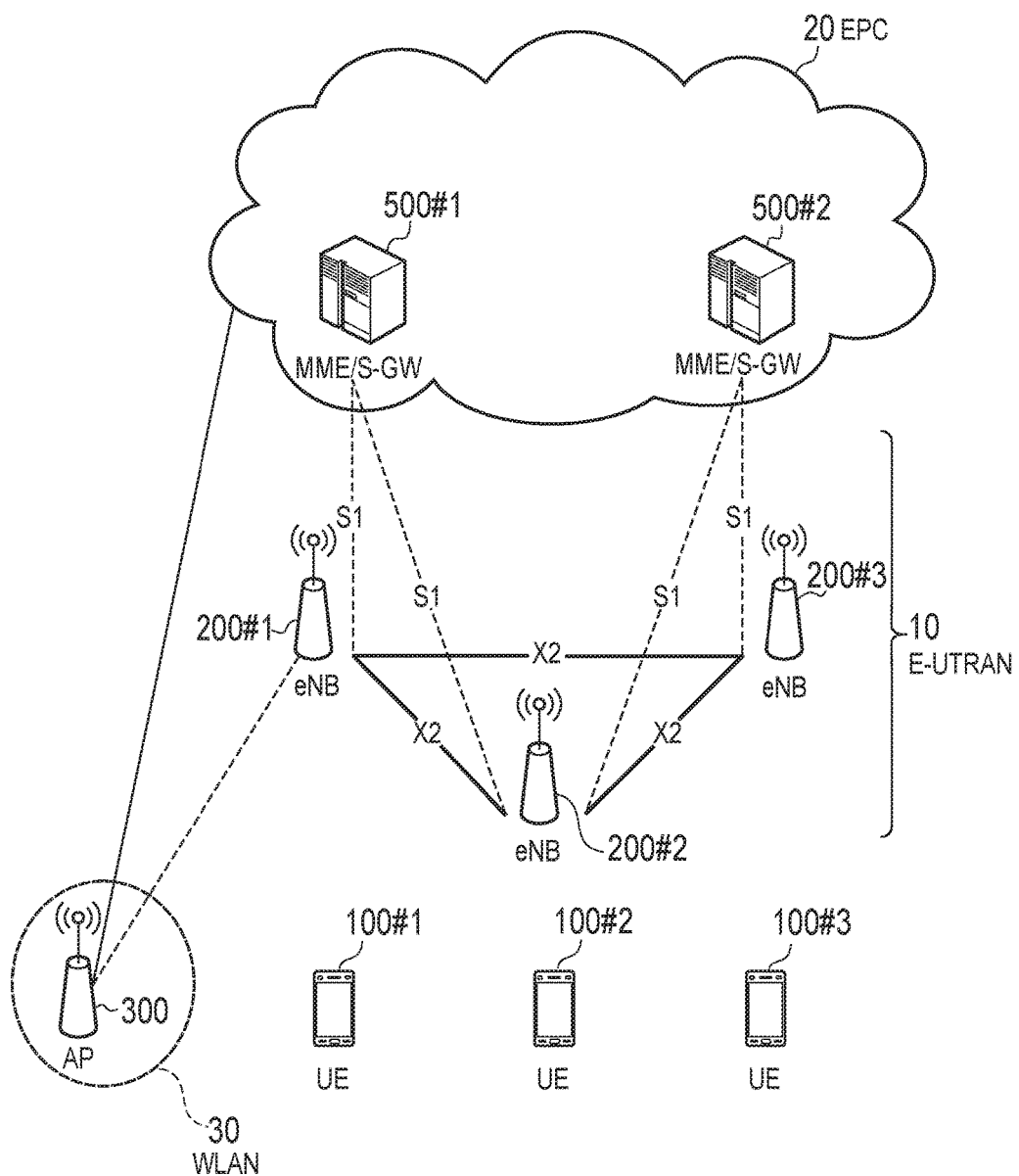
FIG. 1 illustrates a communication system according to an embodiment.

FIG. 1 illustrates a communication system according to the present embodiment. As illustrated in FIG. 1, the LTE system according to the present embodiment includes UEs (User Equipment) 100, E-UTRAN (Evolved-UMTS Terrestrial Radio Access Network) 10, and EPC (Evolved Packet Core) 20.

The E-UTRAN 10 corresponds to a cellular RAN. The EPC 20 corresponds to a core network. The E-UTRAN 10 and the EPC 20 form a network of the LTE system.

The UE 100 is a mobile communication device, and corresponds to a user terminal. The UE 100 is a terminal (dual terminal) that supports both communication schemes of cellular communication and WLAN communication.

The E-UTRAN 10 includes eNBs (evolved Node-Bs) 200. The eNB 200 corresponds to a cellular base station. The eNB 200 manages one or a plurality of cells, and performs radio communication with the UE 100 that establishes a connection with a cell of the eNB 200. The "cell" is used as a term indicating a smallest unit of a radio communication area, and is also used as a term indicating a function of performing radio communication with the UE 100. The eNB 200 has a radio resource management (RRM) function, a routing function of user data, a measurement control function for mobility control and scheduling and the like.

The eNBs 200 are connected mutually via an X2 interface. The eNB 200 is connected to an MME (Mobility Management Entity)/S-GW (Serving-Gateway) 500 included in the EPC 20 via an S1 interface.

The EPC 20 includes MMEs/S-GWs 500. The MME performs different types of mobility control and the like for the UE 100, and corresponds to a control station. The S-GW performs transfer control of the user data, and corresponds to a switching station.

WLAN 30 includes WLAN access point (hereinafter referred to as "AP") 300. The AP 300 is an AP (operator controlled AP) under control of the operator of the LTE network, for example.

The WLAN 30 is formed by conforming with various IEEE 802.11 standards, for example. The AP 300 communicates with the UE 100 in different frequency bands (WLAN frequency bands) than the cellular frequency bands. The AP 300 is connected to the EPC 20 via routers etc.

The eNB 200 and the AP 300 may be located separately, or the eNB 200 and the AP 300 may be located at the same place (collocated). Alternatively, the eNB 200 and the AP 300 are directly connected via operator's interface.

Next, the configurations of UE 100, eNB 200, and AP 300 will be described.

Figure 2:
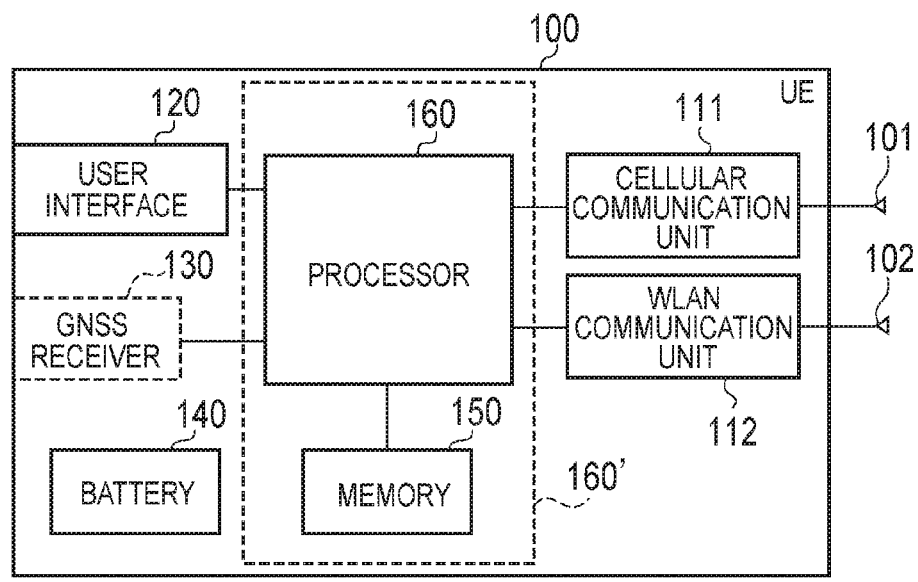
FIG. 2 is a block diagram of a UE according to the embodiment.

FIG. 2 is a block diagram of the UE 100. As illustrated in FIG. 2, the UE 100 includes: antennas 101 and 102; a cellular communication unit 111; a WLAN communication unit 112; a user interface 120; a GNSS (Global Navigation Satellite System) receiver 130; a battery 140; a memory 150; and a processor 160. The memory 150 and the processor 160 form a controller. The UE 100 may not have the GNSS receiver 130. Furthermore, the memory 150 may be integrally formed with the processor 160, and this set (that is, a chipset) may be called a processor 160'.

The antenna 101 and the cellular communication unit 111 are used for transmitting and receiving a cellular radio signal. The cellular communication unit 111 converts a baseband signal output from the processor 160 into the cellular radio signal, and transmits the same from the antenna 101. Further, the cellular communication unit 111 converts the cellular radio signal received by the antenna 101 into the baseband signal, and outputs the same to the processor 160.

The antenna 102 and the WLAN communication unit 112 are used for transmitting and receiving a WLAN radio signal. The WLAN communication unit 112 converts the baseband signal output from the processor 160 into a WLAN radio signal, and transmits the same from the antenna 102. Further, the WLAN communication unit 112 converts the WLAN radio signal received by the antenna 102 into a baseband signal, and outputs the same to the processor 160.

The user interface 120 is an interface with a user carrying the UE 100, and includes, for example, a display, a microphone, a speaker, and various buttons. Upon receipt of the input from a user, the user interface 120 outputs a signal indicating a content of the input to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes the baseband processor that performs modulation and demodulation, encoding and decoding and the like on the baseband signal and a CPU that performs various processes by executing the program stored in the memory 150. The processor 160 may further include a codec that performs encoding and decoding on sound and video signals. The processor 160 executes various processes and various communication protocols described later.

Figure 3:
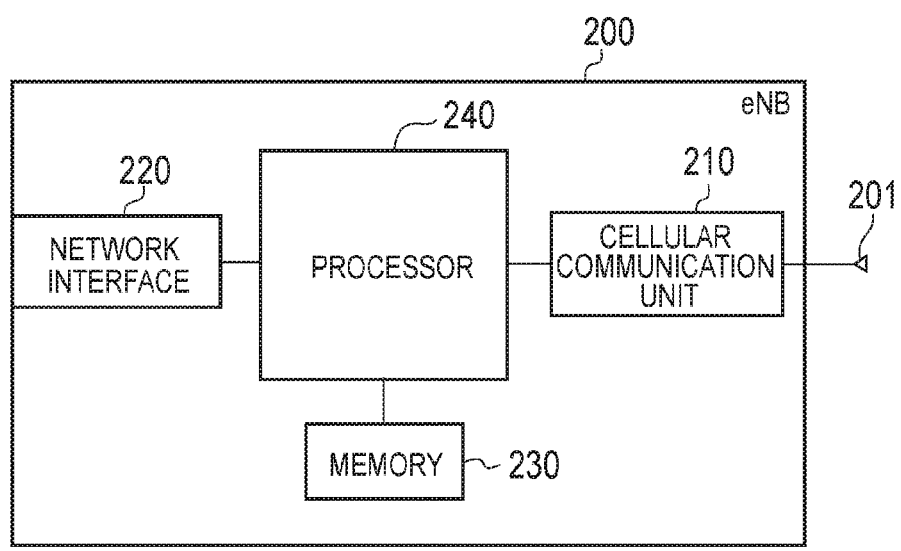
FIG. 3 is a block diagram of an eNB according to the embodiment.

FIG. 3 is a block diagram of the eNB 200. As illustrated in FIG. 3, the eNB 200 includes an antenna 201, a cellular communication unit 210, a network interface 220, a memory 230, and a processor 240. The memory 230 and the processor 240 form a controller. Furthermore, the memory 230 may be integrally formed with the processor 240, and this set (that is, a chipset) may be called a processor.

The antenna 201 and the cellular communication unit 210 are used for transmitting and receiving a cellular radio signal. The cellular communication unit 210 converts the baseband signal output from the processor 240 into the cellular radio signal, and transmits the same from the antenna 201. Furthermore, the cellular communication unit 210 converts the cellular radio signal received by the antenna 201 into the baseband signal, and outputs the same to the processor 240.

The network interface 220 is connected to a backhaul network managed by the operator, for example, and is used for communication with other eNBs 200, the EPC 20, and the AP 300.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various processes by executing the program stored in the memory 230. The processor 240 implements various processes and various communication protocols described later.

Figure 4:
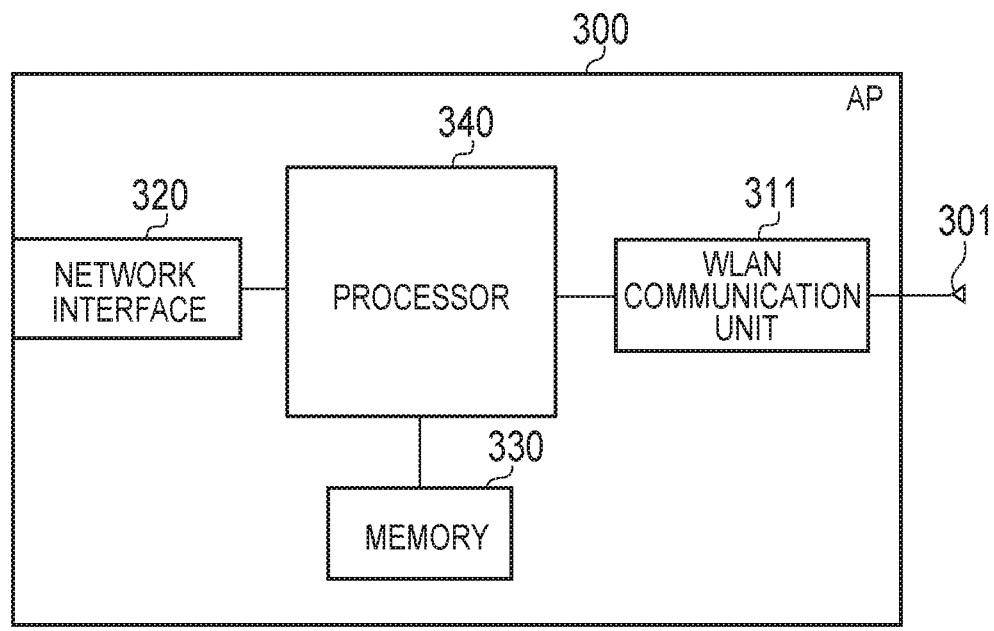
FIG. 4 is a block diagram of an AP according to the embodiment.

FIG. 4 is a block diagram of the AP 300. As illustrated in FIG. 4, the AP 300 includes an antenna 301, a WLAN communication unit 311, a network interface 320, a memory 330, and a processor 340.

The antenna 301 and the WLAN communication unit 311 are used for transmitting and receiving the WLAN radio signal. The WLAN communication unit 311 converts the baseband signal output from the processor 340 into the WLAN radio signal and transmits the same from the antenna 301. Further, the WLAN communication unit 311 converts the WLAN radio signal received by the antenna 301 into the baseband signal and outputs the same to the processor 340.

The network interface 320 is connected to a backhaul network managed by the operator, for example, and is used for communication with other eNBs 200.

The memory 330 stores a program to be executed by the processor 340 and information to be used for a process by the processor 340. The processor 340 includes the baseband processor that performs modulation and demodulation, encoding and decoding and the like on the baseband signal and a CPU that performs various processes by executing the program stored in the memory 330. The processor 340 implements various processes described later.

Figure 5:
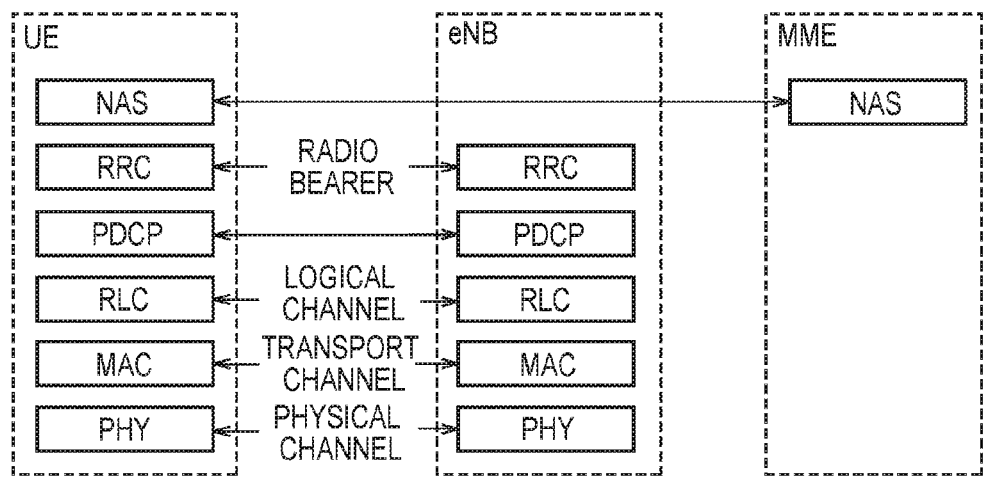
FIG. 5 illustrates a protocol stack of an LTE radio interface according to the embodiment.

FIG. 5 is a protocol stack diagram of a radio interface in the LTE system. As illustrated in FIG. 5, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs priority control of data, and a retransmission process and the like by hybrid ARQ (HARQ). Between the MAC layer of the UE 100 and the MAC layer of the eNB 200, data is transmitted via a transport channel. The MAC layer of the eNB 200 includes a scheduler that selects a transport format (a transport block size, a modulation and coding scheme and the like) of an uplink and a downlink, and an assigned resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in a connected state (RRC connected state), otherwise, the UE 100 is in an idle state (RRC idle state).

A NAS (Non-Access Stratum) layer positioned above the RRC layer performs session management, mobility management and the like.

An application scenario of a communication system according to an embodiment will be described below. The communication system of the embodiment is used in a communication scenario between the eNB 200 and the UE 100 using plural bearers via the AP 300. Specifically, in a downlink where the eNB 200 transmits data for each bearer of plural bears from the eNB 200 to the UEs 100, the UE 100 needs to identify a bearer from which the data is received to communicate using the identified bearer. However, when the UE 100 performs WLAN communication with the eNB 200 via the AP 300, the UE 100 which is a receiver of data cannot identify a bearer to be used. To solve this problem, the communication system of the embodiment can identify the bearer to be used on the receiver side even when the eNB 200 and the UE 100 communicate via the AP 300 using the bearers. The communication system of the embodiment can also be used in uplink communication.

Figure 6:
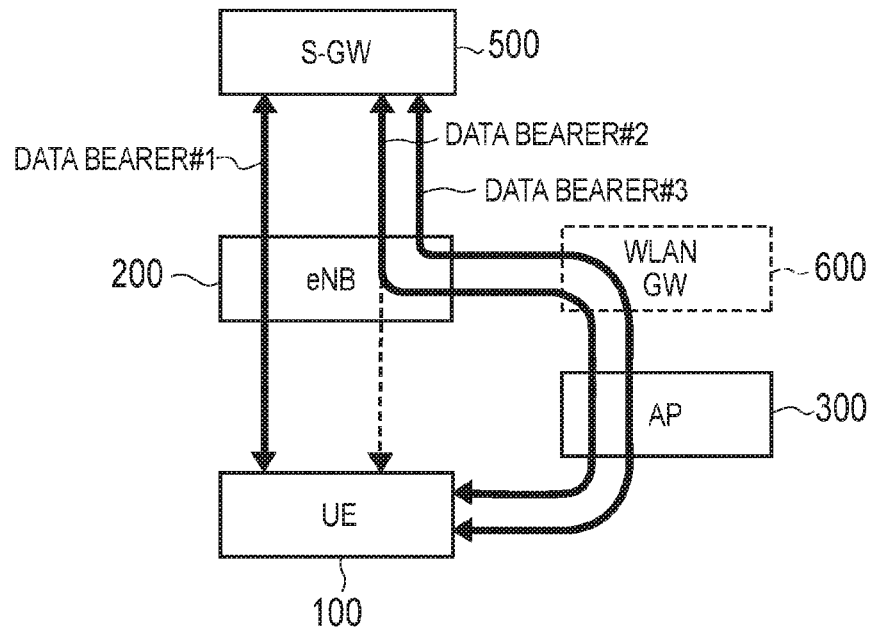
FIG. 6 illustrates a communication control method of the communication system according to the embodiment.

FIG. 6 illustrates a communication control method of a communication system according to the embodiment.

As illustrated in FIG. 6, the communication system of the embodiment establishes data bearer #1 that passes through the eNB 200 without passing through the AP 300, and data bearers #2 and #3 that passes through both the AP 300 and the eNB 200 between the UE 100 and the S-GW 500 (EPC 20). In other words, the UE 100 and the eNB 200 directly transmit and receive data using the data bearer #1. The UE 100 and the eNB 200 also transmit and receive data with using plural bearers (the data bearers #2 and #3) via the AP 300 (and a WLAN GW 600). The UE 100 and the eNB 200 may not directly communicate using the data bearer #1 in the embodiment. The communication system may not include the WLAN GW 600.

The UE 100 has radio connection with the eNB 200 and the AP 300. That is, a radio resource is allocated to the UE 100 from the eNB 200 and the AP 300.

The eNB 200 maintains RRC connection with the UE 100 that has the radio connection with the eNB 200 and the AP 300. The eNB 200 therefore can perform various communication control for the UE 100. An RRC layer of the eNB 200 manages the data bearers #1 and #2.

The communication system of the embodiment enables communication between the UE 100 and the eNB 200 via the AP 300 using the plural bearers.

As illustrated in FIG. 6, the data bearer #2 may be split into two bearers in the eNB 200. One bearer of the split bearers terminates in the UE 100 via the AP 300, and the other bearer terminates in the UE 100 without passing through the AP 300.

Figure 7:
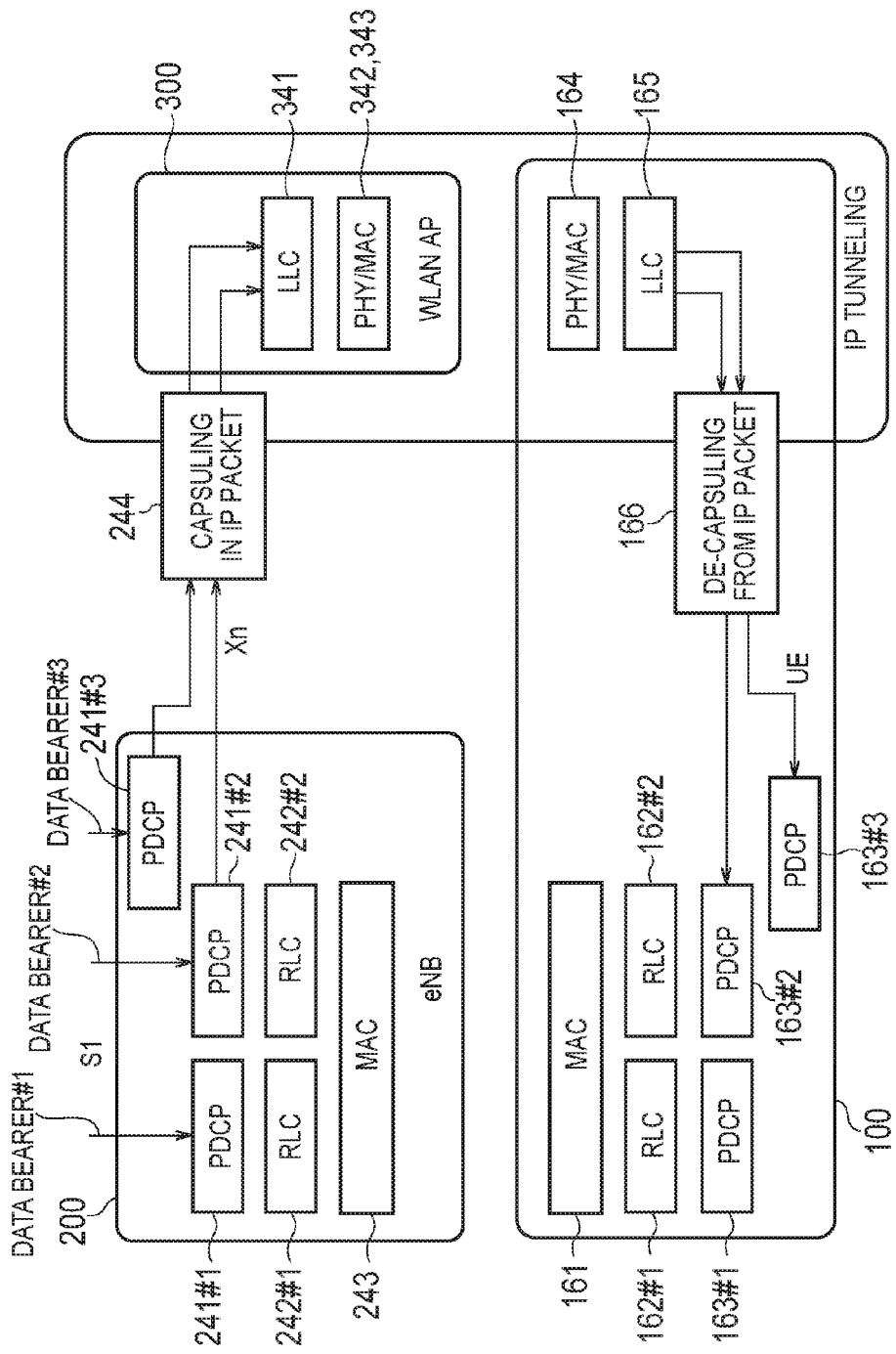
FIG. 7 illustrates a data transmission system according to the embodiment.

FIG. 7 illustrates a data transmission system of the embodiment. In the embodiment, the eNB 200 and the AP 300 transmit and receive data in a PDCP packet that is capsuled into an IP packet in the data bearers #2 and #3.

As illustrated in FIG. 7, the eNB 200 includes a PDCP entity 241#1 for the data bearer #1, a PDCP entity 241#2 for the data bearer #2, a PDCP entity 241#3 for the data bearer #3, an RLC entity 242#1 for the data bearer #1, an RLC entity 242#2 for the data bearer #2, and a MAC entity 243. A capsuling entity 244 (first entity) illustrated in FIG. 7 is a function included in the eNB 200 or the WLAN GW 600.

The AP 300 includes LLC entity 341, MAC LME entity 342, and PHY LME entity 343.

The UE 100 includes a MAC entity 161, an RLC entity 162#1 for the data bearer #1, an RLC entity 162#2 for the data bearer #2, a PDCP entity 163#1 for the data bearer #1, a PDCP entity 163#2 for the data bearer #2, a PDCP entity 163#3 for the data bearer #3, and a PHY/MAC entity 164, an LLC entity 165, and a de-capsuling entity 166 (second entity) for the WLAN.

The PDCP entity 241#2 of the eNB 200 distributes data (PDCP packet) that belongs to the data bearer #2 to the AP 300. The PDCP entity 241#3 distributes the data (PDCP packet) that belongs to the data bearer #3 to the AP 300. The PDCP entity 241#2 may partially distribute the data to the RLC entity 242#2 to transmit the data to the UE 100 via the MAC entity 243. In this case, the UE 100 processes the data that belongs to the data bearer #2 by the MAC entity 161, the RLC entity 162#2, and the PDCP entity 163#2 in this order.

The data (PDCP packet) distributed to the AP 300 is capsuled into the IP packet by the capsuling entity 244 of the eNB 200 (or the WLAN GW 600) and transferred to the AP 300. The capsuling entity 244 capsules the data (PDCP packet) so that the data includes a bearer ID (identification information) to identify the bearers (data bearers #2, #3) used for communication. The AP 300 transmits the IP packet to the UE 100 through the LLC entity 341, the MAC LME entity 342, and the PHY LME entity 343.

The UE 100 processes the data that belongs to the data bearer #2 or #3 by the PHY/MAC entity 164 and the LLC entity 165 in this order, and de-capsules the IP packet by the de-capsuling entity 166 to obtain the PDCP packet. The de-capsuling entity 166 informs the PDCP entity 163 of the PDCP packet in accordance with the bearer ID in the IP packet. Specifically, the de-capsuling entity 166 informs the PDCP entity 163#2 of the PDCP packet when the bearer ID indicates the data bearer #2. The de-capsuling entity 166 informs the PDCP entity 163#3 of the PDCP packet when the bearer ID indicates the data bearer #3. Such capsuling/de-capsuling of the PDCP packet allows IP tunneling to be set in the WLAN section. Security processing, such as encryption, authentication, or the like, is performed in the PDCP to realize LTE level security in the communication on the WLAN side by handing over the PDCP packet to the WLAN side. The security processing, such as encryption, authentication, or the like, may not be performed on the WLAN side.

Meanwhile, the data that belongs to the data bearer #1 is transmitted to the UE 100 through the PDCP entity 241#1, the RLC entity 242#1, and the MAC entity 243. The UE 100 processes the data that belongs to the data bearer #1 by the MAC entity 161, the RLC entity 162#1, and the PDCP entity 163#1 in this order.

Thus, the communication system of the embodiment can identify the PDCP entity 163 to which the UE 100 should input data, when the UE 100 has de-capsuled the data for each bearer transmitted through the bearers via the AP 300.

FIGS. 8(*a*) and 8(*b*) illustrate a protocol stack 1 between eNB and UE according to the embodiment.

As illustrated in FIG. 8(*a*), the eNB 200 capsules the data (PDCP packet) in the PDCP layer in the IP layer by the capsuling entity 244 to generate the IP packet. In the embodiment, the header added to the PDCP packet, that is, the IP address included in the IP header of the IP packet, is allocated for each PDCP entity 163 of the UE 100. In other words, the destination IP address of the IP packet is used as the bearer ID. The IP address may be the IP address of the UE 100, and the header added to the PDCP packet may include a local IP address used in the WLAN network. In this case, the local IP address is allocated to each bearer. The eNB 200 transmits the generated IP packet to the AP 300. The AP 300 transmits the received IP packet to the UE 100. The de-capsuling entity 166 of the UE 100 de-capsules the received IP packet and causes the PDCP entity 162 corresponding to the IP address to process the PDCP packet. In FIG. 8(*a*), the WLAN GW 600 may be disposed between the eNB 200 and the AP 300.

FIG. 8(*b*) illustrates a protocol stack in which the WLAN GW 600 disposed between the eNB 200 and the AP 300 includes the capsuling entity 244. The examples illustrated in FIGS. 8(*a*) and 8(*b*) are the same, except for the apparatus including the capsuling entity 244.

FIG. 9 illustrates a protocol stack 2 between eNB and UE in the embodiment.

As illustrated in FIG. 9, the eNB 200 capsules the data (PDCP packet) of the PDCP layer in an upper layer (e.g., a TCP/UDP layer) of the PDCP layer by the capsuling entity 244. In this case, the capsuling entity 244 generates data including a port number, which corresponds to the bearer used for communication, in the header of the TCP/UDP layer of the PDCP packet. That is, the port number is used as the bearer ID. The port number is correlated with each PDCP entity 163 of the UE 100. Subsequently, the eNB 200 capsules the data including the bearer ID in the TCP/UDP header of the PDCP packet in the IP layer, and transmits the IP packet to the AP 300. The AP 300 transmits the received IP packet to the UE 100. The de-capsuling entity 166 of the UE 100 de-capsules the received IP packet to acquire the port number included in the TCP/UDP header. The de-capsuling entity 166 informs the PDCP entity 163 corresponding the acquired port number of the data (PDCP packet) that includes the port number. The PDCP entity 163 performs communication using the bearer corresponding to the port number.

FIGS. 10(*a*) to 10(*c*) illustrate data configuration of capsuled data in the embodiment. FIGS. 10(*a*) to 10(*c*) illustrate examples of the PDCP packet with the header including the bearer ID added thereto.

FIG. 10(*a*) illustrates the data configuration of data that is capsuled so as to include bearer ID in a Capsule header added to the PDCP packet (PDCP PDU).

FIG. 10(*b*) illustrates the data configuration of data that is capsuled so as to include the bearer ID in the TCP/UDP header added to the PDCP packet (PDCP PDU). The bearer ID is the port number in FIG. 10(*b*). The Capsule header may be added to the PDCP packet.

FIG. 10(*c*) illustrates the data configuration of data that is capsuled so as to include the bearer ID in an IP header added to the PDCP packet (PDCP PDU). The IP address included in the IP header corresponds to the bearer ID in FIG. 10(*c*).

Capsuling the data so that the header of the PDCP packet includes the bearer ID, as illustrated in FIGS. 10(*a*) to 10(*c*), allows the UE 100 to de-capsule the received data to acquire the bearer ID and perform communication using the bearer identified by the acquired bearer ID.

Figure 11:
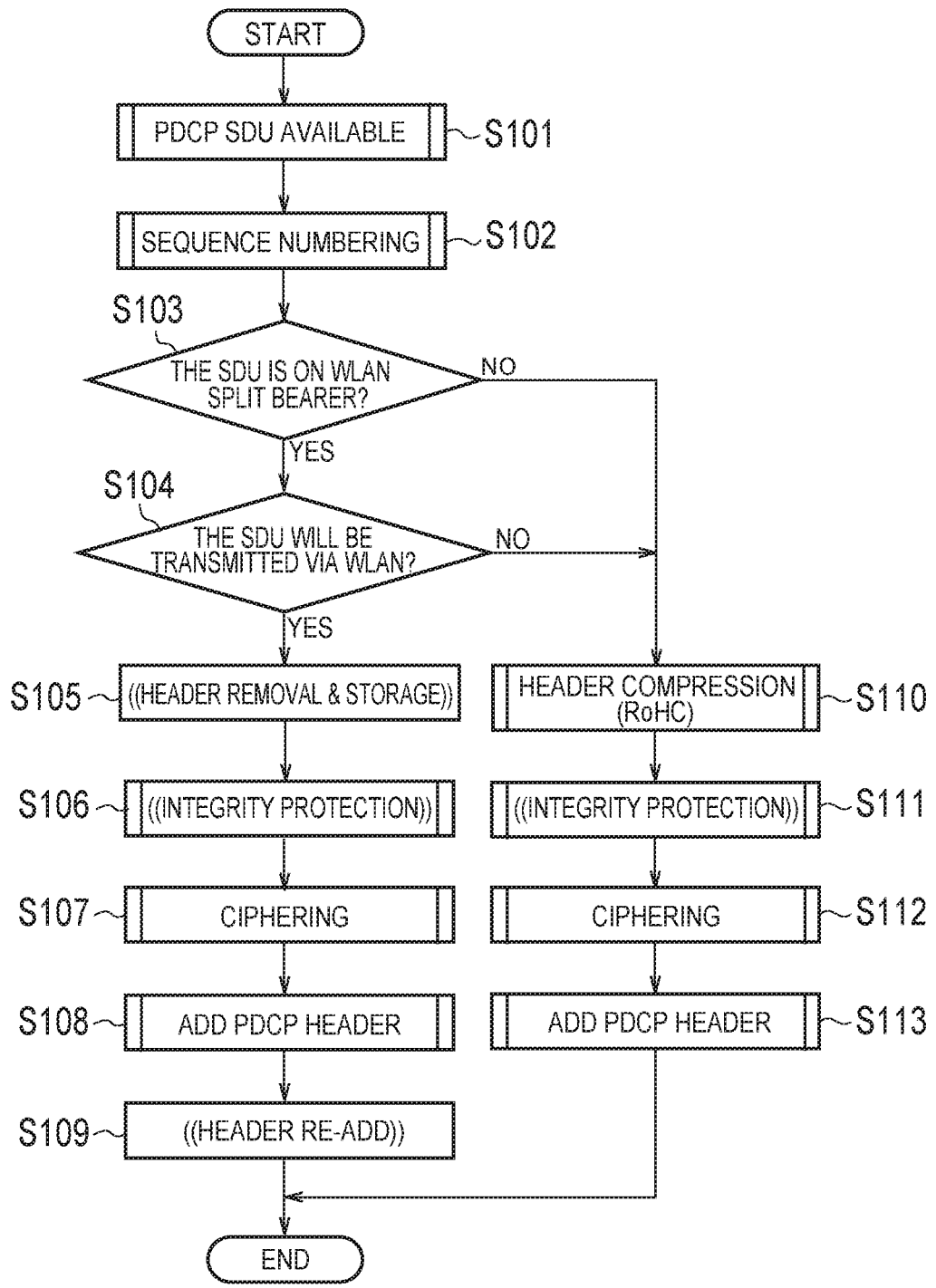
FIG. 11 is a flowchart illustrating a PDCP packet generation procedure according to the embodiment.

FIG. 11 is a flowchart illustrating the procedures of generating the PDCP packet in the embodiment. The eNB 100 generates the PDCP packet in the example of FIG. 11.

In step S101, the eNB 200 acquires a PDCP service data unit (SDU).

In step S102, a sequence number is allocated to the PDCP SDU.

In step S103, it is determined whether the PDCP SDU data is transmitted using a WLAN split bearer. If the PDCP SDU data is not transmitted using the WLAN split bearer (NO at S103), the processing of step S110 is executed. Meanwhile, if the PDCP SDU data is transmitted using the WLAN split bearer (YES at S103), the processing of step S104 is executed.

In S104, it is determined whether the PDCP SDU is transmitted through the WLAN (AP 300). If the PDCP SDU is not transmitted through the WLAN (NO at S104), the processing of step S110 is executed. Meanwhile, if the PDCP SDU is transmitted through the WLAN (YES at S104), the processing of step S105 is executed.

Steps S110 to S113 represent the procedures for generating a conventional PDCP packet.

In step S110, the header of the PDCP SDU is compressed (robust header compression (RoHC)).

In step S111, security assurance is performed for the PDCP SDU after the compression of the header to prevent data operation by a third party.

In step S112, the PDCP SDU is encrypted.

In step S113, the PDCP header is added to the PDCP SDU.

Meanwhile, in step S104, if it is determined that the PDCP SDU is transmitted via the WLAN, the processing of step S105 is executed.

In step S105, the header of the PDCP SDU is removed and the PDCP SDU is stored. The RoHC is not executed when the PDCP SDU is transferred to the AP 300, although the header compression of the PDCP SDU has been ordered.

In step S106, the security assurance is executed for the PDCP SDU after the removal of the header.

In step S107, the PDCP SDU is encrypted.

In step S108, the PDCP header is added to the PDCP SDU. The PDCP header includes the bearer ID.

In step S109, the header that has been removed in step S105 is added again to the PDCP SDU after the addition of the PDCP header.

Figure 12:
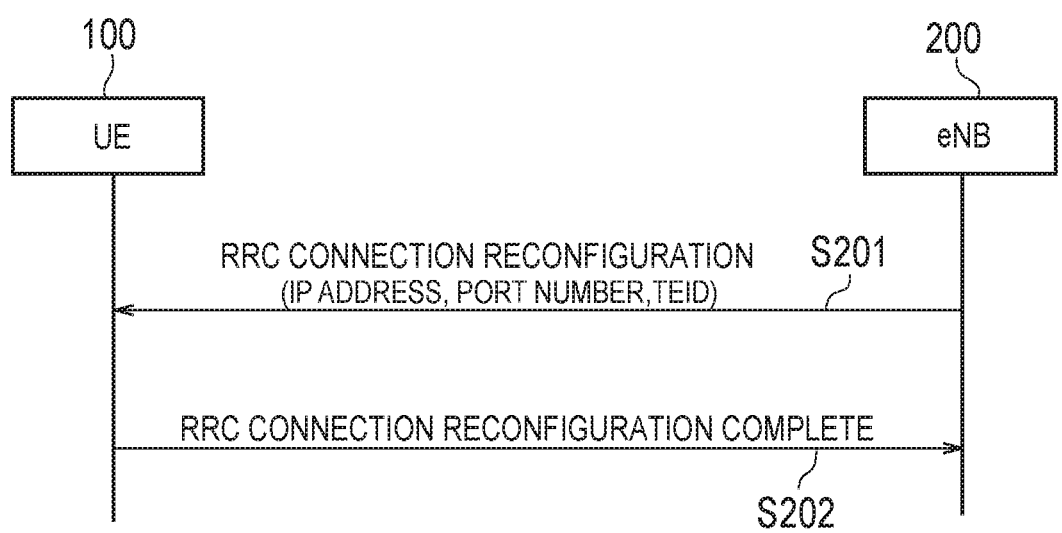
FIG. 12 illustrates an RRC Connection Reconfiguration between eNB and UE according to the embodiment.

FIG. 12 illustrates RRC Connection Reconfiguration between eNB and UE of the embodiment. Operations carried out between eNB and UE illustrated in FIG. 12 are executed before the communication using the bearers between the eNB 200 and the UE 100 via the AP 300.

In step S201, the eNB 200 transmits an RRC Connection Reconfiguration (which is a signal for changing the connection configuration) including at least one of the IP address, the port number, and an end-point ID of GTP-U tunneling (TEID) to the UE 100. The RRC Connection Reconfiguration may include at least one of the IP address, the port number, and the TEID used as the bearer ID. That is, the RRC Connection Reconfiguration includes the bearer ID.

If the port number is used as the bearer ID, the port number may be compressed to the largest number of bearers capable of setting port numbers thereon. For example, if the largest number of bearers is 8, the port number is compressed to 3-bit information. In one example of compression, the port number=65536 (16 bits)−bearer ID. In another example of compression, the port number=65528+bearer ID. The numbers may be randomly selected other than the illustrated numbers "65536" and "65528".

The UE 100 correlates the bearer ID included in the received RRC Connection Reconfiguration with the PDCP entity 163.

In step S202, the UE 100 transmits an RRC Connection Reconfiguration Complete to the eNB 200.

Thus, the UE 100 can manage the PDCP entity 163 of the UE 100 and the bearer ID by correlating them with each other. When the UE 100 receives data transmitted from the eNB 200 via the AP 300, the UE 100 can process the PDCP packet by the PDCP entity 163 that corresponds to the bearer ID included in the data.

Alternatively, the UE 100 may manage a predetermined table that describes correlation between the PDCP entity 163 and the bearer ID.

FIG. 13 is a sequence diagram illustrating operation procedures of the eNB 200 inquiring information of the UE 100 that communicates with the AP 300 (or the WLAN GW 600) in the embodiment.

In step S301, the eNB 200 and the UE 100 are in an RRC Connected state in which the RRC Connection is established therebetween.

In step S302, the link is established between the AP 300 and the UE 100.

In step S303, the eNB 200 transmits, to the AP 300 (or the WLAN GW 600), a UE inquiry inquiring the IP address of the UE 100 that is used for the communication with the AP 300. The UE inquiry includes a UE-ID for identifying the UE 100 with which the RRC Connection has been established in step S301.

In step S304, the AP 300 (or the WLAN GW 600) searches for the IP address of the UE 100 corresponding to the UE-ID included in the UE inquiry.

In step S305, the AP 300 transmits a UE inquiry response including the found IP address to the eNB 200.

Alternatively, the eNB 200 may directly inquire the UE 100 for the information used for the WLAN communication.

In step S306 subsequent to the step S302, the eNB 200 transmits, to the UE 100, the WLAN information inquiry inquiring information used for the communication between the UE 100 and the AP 300.

In step S308, the UE 100 acquires information used for the communication with the AP 300 when the link is established between the UE 100 and the AP 300. The information used for the communication with the AP 300 includes the IP address, an SSID, or the like.

In step S309, the UE 100 transmits a WLAN information inquiry response that includes the information acquired in step S308 to the eNB 200.

The above procedures allow the eNB 200 to acquire information necessary for the communication with the UE 100 via the AP 300.

The communication system of the embodiment described above can identify the bearer, which is to be used on the receiver side, based on the bearer ID that identifies the bearer used in transmission, even when the eNB 200 and the UE 100 communicate using the plural bearers via the AP 300. On the receiver side, the received data is input to the PDCP entity that is correlated with the identified bearer. Thus, the eNB 200 and the UE 100 can communicate with each other via the AP 300 using the plural bearers.

Other Embodiments

In the embodiment described above, the eNB 200 or the WLAN GW 600 includes the capsuling entity 244, and the UE 100 includes the de-capsuling entity 166. In the uplink communication, for example, the UE 100 may perform a function corresponding to the capsuling entity 244, and the eNB 200 or the WLAN GW 600 may perform a function corresponding to the de-capsuling entity 166.

The LTE system has been described in the embodiment as an example cellular communication system. However, any cellular communication system other than the LTE system may be used.

The entire contents of Japanese application No. 2014-097180 (filed on May 8, 2014) has been incorporated into this specification by reference.

The invention claimed is:

1. A cellular base station, comprising:
a controller containing at least one processor and at least one memory, and configured to execute functions of:
a plurality of packet data convergence protocol (PDCP) entities corresponding to a plurality of bearers used in performing a communication with a user terminal in which the user terminal is configured to utilize radio resources of the cellular base station and a wireless local area network (WLAN) access point; and
a specific entity that adds, to a PDCP packet generated by each of the plurality of PDCP entities, a header including a bearer identifier to generate a specific packet, wherein
the plurality of PDCP entities comprises:
a first PDCP entity that splits PDCP packets of a first bearer and provides the specific entity and a radio link control (RLC) entity with the split PDCP packets, wherein the specific entity adds, to the PDCP packets generated by the first PDCP entity, a first header including a first bearer identifier identifying the first bearer; and
a second PDCP entity that provides only the specific entity with PDCP packets of a second bearer, wherein the specific entity adds, to the PDCP packets generated by the second PDCP entity, a second header including a second bearer identifier identifying the second bearer, the bearer identifier is for identifying a bearer to which the specific packet belongs, from the plurality of bearers, and the specific entity transmits the specific packet to the user terminal via the WLAN access point.

2. The cellular base station according to claim 1, wherein the controller is further configured to execute a function of radio resource control (RRC) entity that transmits an RRC message to the user terminal, and the RRC entity configures the user terminal with the bearer identifier using the RRC message.

3. The cellular base station according to claim 1, wherein the specific entity transmits the specific packet to the user terminal via a WLAN management apparatus and the WLAN access point, the WLAN management apparatus managing the WLAN access point.

4. A user terminal, comprising:

a controller containing at least one processor and at least one memory, and configured to execute a communication in which the user terminal is configured to utilize radio resources of a cellular base station and a wireless local area network (WLAN) access point, wherein the controller is further configured to execute functions of:
  a specific entity that receives a specific packet transmitted from the cellular base station via the WLAN access point; and
  a plurality of packet data convergence protocol (PDCP) entities corresponding to a plurality of bearers used in executing the communication, the specific packet is provided with a header including a bearer identifier for identifying a bearer to which the specific packet belongs, from the plurality of bearers, and the plurality of PDCP entities comprises:
  a first PDCP entity that receives PDCP packets of a first bearer from the specific entity and a radio link control (RLC) entity; and
  a second PDCP entity that receives PDCP packets of a second bearer only from the specific entity, the specific entity identifies a destination PDCP entity to which the specific packet is destined based on the bearer identifier, from among the plurality of PDCP entities, and delivers the specific packet from which the header is removed, to the identified destination PDCP entity.

5. The user terminal according to claim 4, wherein the controller is further configured to execute a function of radio resource control (RRC) entity that receives an RRC message including the bearer identifier to be configured for the user terminal.

6. The user terminal according to claim 4, wherein the specific entity receives the specific packet transmitted from the cellular base station via a WLAN management apparatus and the WLAN access point, the WLAN management apparatus managing the WLAN access point.

7. An apparatus for a cellular base station, comprising:

at least one processor and at least one memory, the at least one processor configured to execute functions of:
  a plurality of packet data convergence protocol (PDCP) entities corresponding to a plurality of bearers used in performing a communication with a user terminal in which the user terminal is configured to utilize radio resources of the cellular base station and a wireless local area network (WLAN) access point; and
  a specific entity that adds, to a PDCP packet generated by each of the plurality of PDCP entities, a header including a bearer identifier to generate a specific packet, wherein the plurality of PDCP entities comprises:
  a first PDCP entity that splits PDCP packets of a first bearer and provides the specific entity and a radio link control (RLC) entity with the split PDCP packets, wherein the specific entity adds, to the PDCP packets generated by the first PDCP entity, a first header including a first bearer identifier identifying the first bearer; and
  a second PDCP entity that provides only the specific entity with PDCP packets of a second bearer, wherein the specific entity adds, to the PDCP packets generated by the second PDCP entity, a second header including a second bearer identifier identifying the second bearer, the bearer identifier is for identifying a bearer to which the specific packet belongs, from the plurality of bearers, and the specific entity transmits the specific packet to the user terminal via the WLAN access point.

8. An apparatus for a user terminal, comprising:

at least one processor and at least one memory, the at least one processor configured to execute a communication in which the user terminal is configured to utilize radio resources of a cellular base station and a wireless local area network (WLAN) access point, wherein the at least one processor is further configured to execute functions of:
  a specific entity that receives a specific packet transmitted from the cellular base station via the WLAN access point; and
  a plurality of packet data convergence protocol (PDCP) entities corresponding to a plurality of bearers used in executing the communication, the specific packet is provided with a header including a bearer identifier indicating a bearer to which the specific packet belongs, from the plurality of bearers, and the plurality of PDCP entities comprises:
  a first PDCP entity that receives PDCP packets of a first bearer from the specific entity and a radio link control (RLC) entity; and
  a second PDCP entity that receives PDCP packets of a second bearer only from the specific entity, the specific entity identifies a destination PDCP entity to which the specific packet is destined based on the bearer identifier, from among the plurality of PDCP entities, and delivers the specific packet from which the header is removed, to the identified destination PDCP entity.

* * * * *